United States Patent
Majerus et al.

(10) Patent No.: US 12,197,550 B2
(45) Date of Patent: Jan. 14, 2025

(54) PROVIDING ACCESS TO A COMPUTING DEVICE

(71) Applicant: Micron Technology, Inc., Boise, ID (US)

(72) Inventors: Diana C. Majerus, Boise, ID (US); Brenda D. Kraus, Boise, ID (US); Ying Zhang, Boise, ID (US); Soo Koon Ng, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 337 days.

(21) Appl. No.: 17/572,762

(22) Filed: Jan. 11, 2022

(65) Prior Publication Data

US 2023/0205855 A1 Jun. 29, 2023

Related U.S. Application Data

(60) Provisional application No. 63/294,556, filed on Dec. 29, 2021.

(51) Int. Cl.
*G06F 21/00* (2013.01)
*G06F 21/32* (2013.01)
*G06V 40/16* (2022.01)

(52) U.S. Cl.
CPC ............ *G06F 21/32* (2013.01); *G06V 40/172* (2022.01)

(58) Field of Classification Search
CPC ................................ G06F 21/32; G06F 21/31
See application file for complete search history.

(56) References Cited

U.S. PATENT DOCUMENTS 10,491,602 B2 * 11/2019 Tamma ................. H04L 63/107
11,003,798 B1 * 5/2021 Mhaske ................ G06F 21/629
(Continued)

FOREIGN PATENT DOCUMENTS

| CN | 102034079 A | 4/2011 |
| CN | 105095856 A | 11/2015 |

(Continued)

OTHER PUBLICATIONS

CNET, "Yes, you can use FaceID to unlock your iPhone while wearing a mask, but there's a catch", https://www.cnet.com/tech/services-and-software/yes-you-can-use-faceid-to-unlock-your-phone-while-wearing-a-mask-but-theres-a-catch/, © 2022, 4 pages.

(Continued)

*Primary Examiner* — Tri M Tran
(74) *Attorney, Agent, or Firm* — Brooks, Cameron & Huebsch, PLLC

(57) ABSTRACT

Methods and devices associated with providing access to a computing device are described. A method can include generating a real-time image including an attempted user, comparing the real-time image to a reference image of an authorized user, identifying an obstructed portion of the attempted user, comparing an unobstructed portion of the attempted user to a portion of the authorized user corresponding to the unobstructed portion of the attempted user, providing access to a computing device in response to the unobstructed portion of the attempted user matching the portion of the authorized user, and rejecting access to the computing device in response to the unobstructed portion of the attempted user being different from the portion of the authorized user.

17 Claims, 6 Drawing Sheets

(56) References Cited

U.S. PATENT DOCUMENTS

2021/0326579 A1\* 10/2021 Harris .................. G06V 40/171
2021/0358244 A1\* 11/2021 Chafni .................. G07C 9/257
2022/0012317 A1\* 1/2022 Byrne .................. G06V 10/17
2022/0328050 A1\* 10/2022 Hennig .................. G10L 17/24

FOREIGN PATENT DOCUMENTS

CN 107016379 A 8/2017
CN 107609497 A 1/2018
WO WO-2016049273 A1 \* 3/2016 ........... A61B 3/1216

OTHER PUBLICATIONS

BBC News, "Apple Face ID to work for mask wearers", https://www.bbc.com/news/technology-55904562, Feb. 2, 2021, 7 pages.

\* cited by examiner

PROVIDING ACCESS TO A COMPUTING DEVICE

PRIORITY INFORMATION

This application claims benefit over U.S. Provisional application No. 63/294,556, filed Dec. 29, 2021, the contents of which are incorporated herein by reference.

TECHNICAL FIELD

The present disclosure relates generally to apparatuses, systems, and methods associated with providing access to a computing device.

BACKGROUND

A computing device can be a smartphone, a wearable device, a tablet, a laptop, a desktop computer, a smart assistant device, or a cloud computing device, for example. The computing device can receive and/or transmit data and can include or be coupled to one or more memory devices. Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random-access memory (DRAM), static random-access memory (SRAM), synchronous dynamic random-access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random-access memory (RRAM), and magnetoresistive random access memory (MRAM), such as spin torque transfer random access memory (STT RAM), among others.

DETAILED DESCRIPTION

Figure 1A:
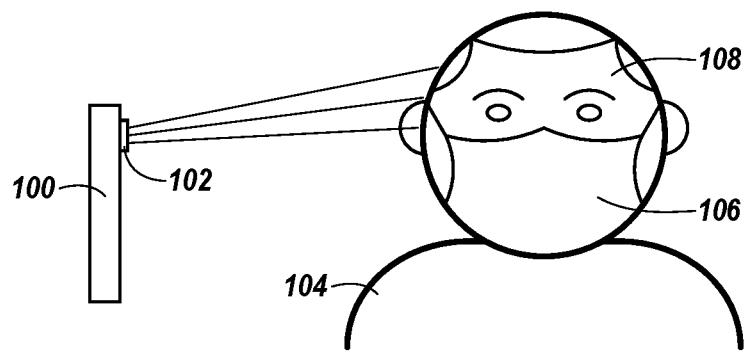
FIG. 1A illustrates an example of a computing device for generating a real-time image of an attempted user in accordance with a number of embodiments of the present disclosure.

The present disclosure includes apparatuses and methods related to generating a real-time image including an attempted user using an image sensor, comparing the real-time image to a reference image of an authorized user stored in a memory resource using a processing resource coupled to the image sensor, identifying an obstructed portion of the attempted user in the real-time image based at least in part on comparing the real-time image to the reference image, comparing an unobstructed portion of the attempted user in the real-time image to a portion of the authorized user in the reference image corresponding to the unobstructed portion of the attempted user in the real-time image, providing access to a computing device in response to the unobstructed portion of the attempted user in the real-time image matching the portion of the authorized user in the reference image, and rejecting access to the computing device in response to the unobstructed portion of the attempted user in the real-time image being different from the portion of the authorized user in the reference image.

Current facial recognition settings and/or software cannot identify an attempted user with a partially obstructed face. The attempted user's face can be partially obstructed due to eyewear and/or a mask, for example. Often an attempted user is unable to open a computing device because facial recognition settings and/or software cannot identify the attempted user with a partially obstructed face. This can inconvenience or endanger the attempted user by forcing them to remove their eyewear and/or mask, use their finger to enter a passcode or for fingerprint recognition, or use another computing device.

Embodiments of the present disclosure can enable an attempted user with a partially obstructed face to access a computing device by allowing an authorized user to customize security settings of the computing device. The security settings can determine circumstances in which the computing device can be accessed and/or a type of access an attempted user can have. For example, an attempted user can be rejected from using a computing device or receive limited or unlimited access to the computing device based on an unobstructed portion of the attempted user's face, a secondary authentication method, a location of the computing device, the present time, the present day of the week, and/or the present date.

As used herein, "a number of" something can refer to one or more of such things. A "plurality" of something intends two or more. The figures herein follow a numbering convention in which the first digit or digits correspond to the drawing figure number and the remaining digits identify an element or component in the drawing. Similar elements or components between different figures may be identified by the use of similar digits. For example, reference numeral 102 may reference element "2" in FIG. 1A and/or FIG. 1B, and a similar element may be referenced as 202 in FIG. 2. In some instances, a plurality of similar, but functionally and/or structurally distinguishable, elements or components in the same figure or in different figures may be referenced sequentially with the same element number. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

Figure 1B:
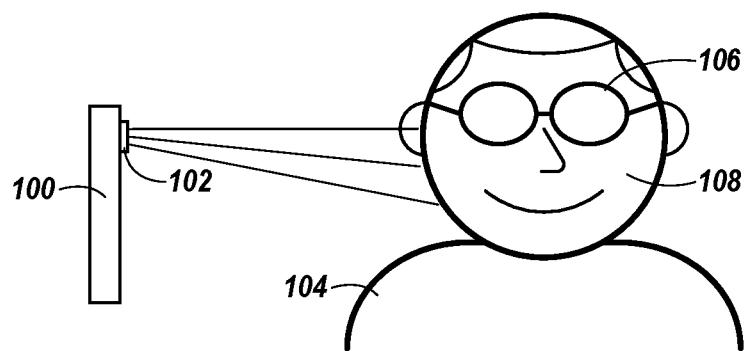
FIG. 1B illustrates an example of a computing device for generating a real-time image of an attempted user in accordance with a number of embodiments of the present disclosure.

FIGS. 1A and 1B illustrate examples of a computing device 100 for generating an image of an attempted user 104 in accordance with a number of embodiments of the present disclosure. The computing device 100 can be, but is not limited to, a smartphone, a wearable device, a tablet, a laptop, a desktop computer, a smart assistant device, or any combination thereof. The computing device 100 can further include an image sensor 102 (e.g., a camera) to generate the image (e.g., a photograph and/or video) of an attempted user 104.

The face of attempted user 104 can include an obstructed portion 106 and an unobstructed portion 108. The obstructed portion 106 can be covered and/or altered while the unobstructed portion 108 can be exposed and/or unchanged. The face of the attempted user 104 can be obstructed by a mask, as illustrated in FIG. 1A or eyewear, as illustrated in FIG. 1B. However, a face of an attempted user 104 can also be obstructed by other items or personal features, such as, scarves, hats, costumes, bandanas, bangs, facial hair, and/or makeup, for example.

In a number of embodiments, the computing device 100 can identify the obstructed portion 106 of the face of the attempted user 104 by comparing a real-time image captured by the image sensor 102 to a reference image stored in memory of the computing device 100. In response to identifying the obstructed portion 106, the computing device 100 can compare the unobstructed portion 108 to a portion of the reference image stored in the memory corresponding to the unobstructed portion 108.

Since the unobstructed portion 108 in FIG. 1A includes the eyes, eyebrows, ears, and hairline of the user 104, the computing device 100 can focus a comparison on these features. For example, the computing device 100 can measure the distance between the eyes of the attempted user 104 by determining the number of pixels between the eyes of the attempted user 104.

In FIG. 1B, the unobstructed portion 108 includes the mouth, nose, ears, chin, and hairline of the attempted user 104, accordingly the computing device 100 can focus a comparison on these features. For example, the computing device 100 can compare the color value of a pixel of the lips of the attempted user 104 in the real-time image to the color value of a pixel of the lips of the authorized user in the stored reference image. If the color values do not match because the attempted user 104 is wearing lipstick, for example, the computing device 100 may compare the ear size of the attempted user 104 in the real-time image to the ear size of the authorized user in the stored reference image.

Figure 2:
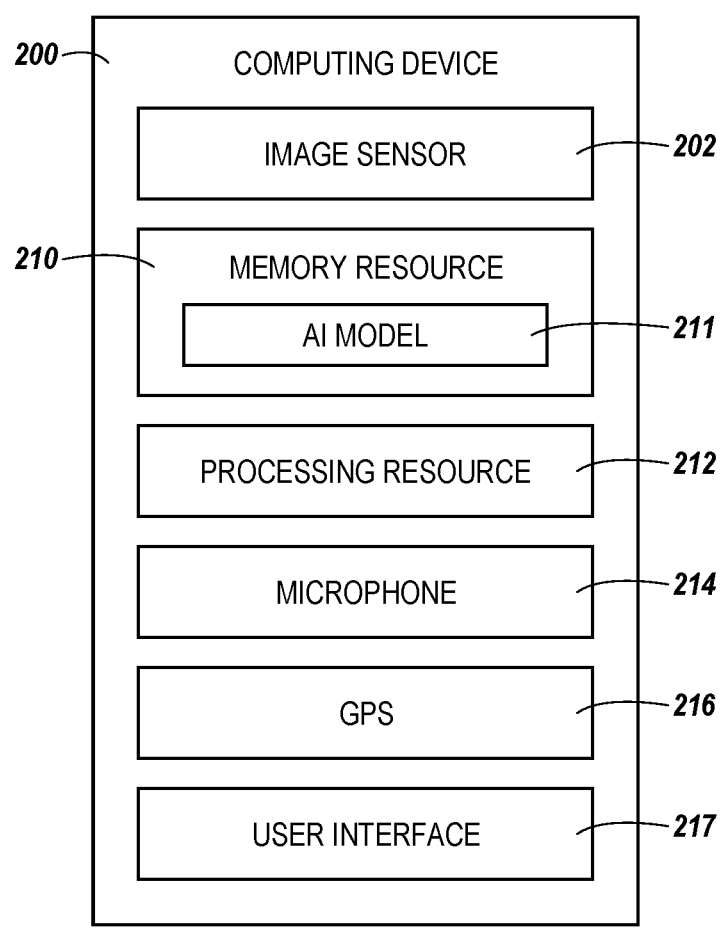
FIG. 2 illustrates an example of a computing device for generating a real-time image of an attempted user in accordance with a number of embodiments of the present disclosure.

FIG. 2 illustrates an example of a computing device 200 for generating a real-time image of an attempted user in accordance with a number of embodiments of the present disclosure. The computing device 200 can include an image sensor 202 to generate the real-time image of the attempted user. Computing device 200 can correspond to computing device 100 in FIG. 1 and image sensor 202 can correspond to image sensor 102 in FIG. 1. In a number of embodiments, the computing device 200 can further include a memory resource 210, a processing resource 212, a microphone 214, a geographic positioning system (GPS) 216, and/or a user interface 217.

The memory resource (e.g., memory) 210 can include volatile and/or non-volatile memory, for instance, DRAM and/or NAND. The memory 210 can be coupled to the processing resource 212 (e.g., processor) and can store an artificial intelligence (AI) model 211. The memory 210 can be any type of storage medium that can be accessed by the processing resource 212 to perform various examples of the present disclosure. For example, the memory 210 can be a non-transitory computer readable medium having computer readable instructions (e.g., computer program instructions) stored thereon that are executable by the processing resource 212 to generate a real-time image including an attempted user using the image sensor 202, compare the real-time image to a reference image of an authorized user stored in the memory 210 using the processing resource 212 coupled to the image sensor 202, identify an obstructed portion of the attempted user in the real-time image based at least in part on comparing the real-time image to the reference image, compare an unobstructed portion of the attempted user in the real-time image to a portion of the authorized user in the reference image corresponding to the unobstructed portion of the attempted user in the real-time image, provide access to the computing device 200 in response to the unobstructed portion of the attempted user in the real-time image matching the portion of the authorized user in the reference image, and reject access to the computing device 200 in response to the unobstructed portion of the attempted user in the real-time image being different from the portion of the authorized user in the reference image.

The processing resource 212 can determine a location of the computing device 200 and compare the unobstructed portion of the attempted user in the real-time image to the portion of the authorized user in the reference image corresponding to the unobstructed portion of the attempted user in the real-time image based at least in part on the location of the computing device 200. In some examples, the location of the computing device 200 can be determined using the GPS 216, a Wi-Fi network, a Bluetooth connection, and/or image recognition. The computing device 200 can be connected to a particular Wi-Fi network or a Bluetooth connection, which can have a known location. For example, the computing device 200 can be connected to the authorized user's home Wi-Fi network or the computing device 200 can have a Bluetooth connection with the authorized user's vehicle. Both of these locations could have particular security settings. In some locations, the computing device 200 may require only partial facial recognition by allowing the attempted user access to the computing device 200 when a portion of the attempted user's face is obstructed and/or access to the computing device may be limited based on the location of the computing device. For example, an attempted user may be able to make phone calls and receive and transmit text messages but may not be able to make purchases at a location of a store without using full facial recognition.

In some examples, the computing device 200 may not be able to determine a location of the computing device 200 and/or an authorized user may not provide access for the computing device 200 to determine the location of the computing device 200. The computing device 200, in these circumstances, may determine a security setting based on whether the computing device 200 is in a less secure and/or public location. The computing device 200 can determine whether the computing device 200 is in a less secure and/or public location based on the background of the real-time image. For example, the computing device 200 may determine the background includes retail shelves and determine the computing device 200 is located within a store. Accordingly, the computing device 200 can initiate security settings for a less secure and/or public location.

In a number of embodiments, the processing resource 212 can determine a time, day of the week, and/or date and compare the unobstructed portion of the attempted user in the real-time image to a portion of the authorized user in the reference image corresponding to the unobstructed portion of the attempted user in the real-time image based at least in part on the time, the day of the week, and/or the date. The time, day of the week, and/or date can be determined from the operating system of the computing device and/or an application on the computing device, for instance, a calendar application.

The authorized user can set and/or create security settings that allow access to the computing device 200 even with an obstructed portion of the attempted user. In a number of embodiments, the authorized user may allow access to the computing device 200 with an obstructed portion of the real-time image and/or allow limited access to the computing device 200 based on the time, day of the week, and/or the date.

In some examples, another authentication method can be requested in response to the computing device 200 identifying the obstructed portion of the attempted user. The computing device 200 can receive real-time audio from the attempted user via the microphone 214 and compare the real-time audio to reference audio of the authorized user stored in the memory 210. If the real-time audio matches the reference audio in memory, access can be provided to the computing device 200.

In a number of embodiments, the computing device 200 can generate the user interface 217. The user interface 217 can be a graphical user interface (GUI) that can provide and/or receive information to and/or from an attempted user and/or an authorized user of the computing device 200. The user interface 217 can be shown on a display of the computing device 200. In some examples, the user interface 217 can display a prompt to set a security setting based on the location of the computing device 200 and/or the time, day of the week, and/or date. The security setting can determine circumstances in which the computing device 200 can be accessed and/or a type of access an attempted user can have.

The computing device 200 can perform a facial recognition operation prior to receiving and/or implementing a security setting. For example, the image sensor 202 can capture another real-time image including another attempted user and the processing resource 212 can compare the other real-time image to the reference image and receive a security setting for a current location of the computing device 200 and/or the current time, day of the week, and/or date in response to the other attempted user in the other real-time image matching the authorized user in the reference image.

The computing device 200 can include hardware, software, and/or firmware that is configured to perform operations (e.g., logic operations, among other operations) associated with AI operations using the AI model 211. In some examples, the AI model 211 can be trained on and/or external to the computing device 200. Data from an authorized user or sample data can be used to train the AI model 211. The AI model 211 can receive a present image, a present timestamp, a present location, or present audio each time the processing resource 212 provides access to the computing device 200 to train the AI model 211 to identify when the authorized user would like access to be granted. For example, the AI model 211 can output a security setting in response to performing an AI operation on the present image, the present timestamp, the present location, and/or the present audio.

In a number of embodiments, the image sensor 202 can generate another real-time image including the attempted user after a particular period of time has passed since providing access to the attempted user. The image sensor 202 can generate real-time images periodically to ensure the attempted user is an authorized user even after the attempted user has accessed the computing device 200. The processing resource 212 can compare the other real-time image to the reference image. If the unobstructed portion of the attempted user in the other real-time image matches the portion of the authorized user in the reference image, the processing resource 212 can continue providing access to the computing device 200. If the unobstructed portion of the attempted user in the other real-time image is different from the portion of the authorized user in the reference image, the processing resource 212 can reject access to the computing device 200. In some examples, the processing resource 212 can lock the computing device 200, alert a backup device of a security breach, transmit a message to alert the authorized user of a security breach, sign out of accounts on the computing device 200, store a picture and/or fingerprint of the attempted user, and/or transmit the picture and/or fingerprint of the attempted user.

Figure 3:
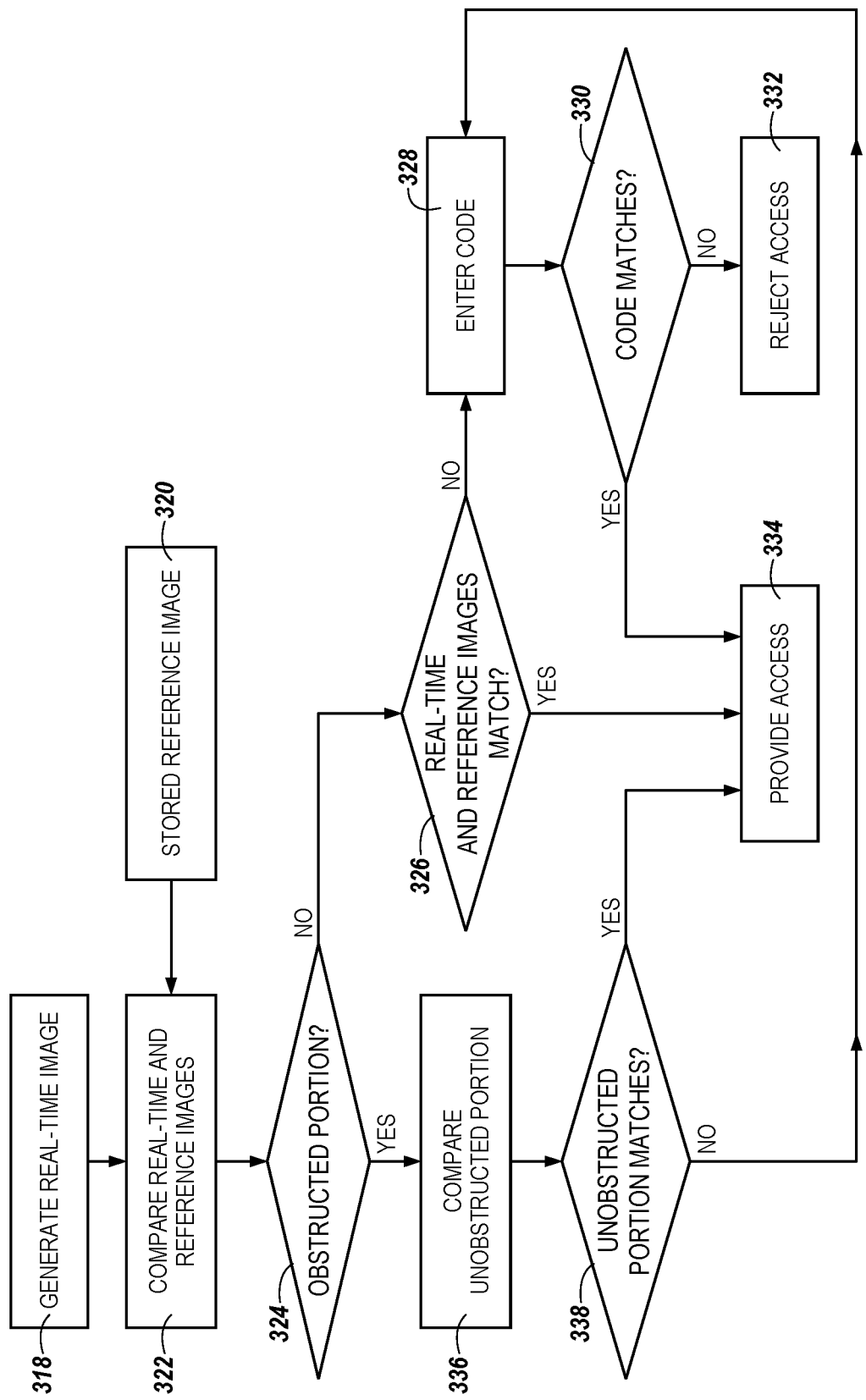
FIG. 3 illustrates an example of a flow diagram for providing access to a computing device in accordance with a number of embodiments of the present disclosure.

FIG. 3 illustrates an example of a flow diagram for providing access to a computing device (e.g., computing device 100 in FIG. 1 and/or computing device 200 in FIG. 2) in accordance with a number of embodiments of the present disclosure. An image sensor (e.g., image sensor 102 in FIG. 1 and/or image sensor 202 in FIG. 2) of the computing device can generate a real-time image of an attempted user at block 318.

A memory (e.g., memory 210 in FIG. 2) of the computing device can store a reference image of an authorized user at block 320. The reference image can be taken of the authorized user during setup of the computing device and/or when setting security settings. In some examples, the authorized user can capture the reference image including their face without any obstructions. The reference image can be used by the computing device for full or partial facial recognition.

The real-time image and the reference image can be compared at block 322 during a facial recognition operation. In a number of embodiments, a facial recognition operation can include comparing pixel values of the real-time image to pixel values of the reference image. The computing device can determine a portion of the attempted user in the real-time image is obstructed at block 324 in response to a particular number of pixels in the real-time image being different from a corresponding number of pixels in the reference image. For example, if a significant percentage of pixel values are green in the real-time image and the corresponding pixels in the reference image are tan, the computing device can determine a portion of the attempted user in the real-time image is obstructed.

If the computing device determines there is no obstructed portion in the real-time image at block 324, the computing device can determine whether the real-time image and the reference image match at block 326. The real-time image and the reference image can match if a threshold number of pixel values are equal to pixel values of corresponding pixels in the reference image. The computing device can provide access to the attempted user at block 334 if the real-time image and the reference image match.

If the real-time and reference images do not match, the attempted user can enter a code at block 328. The computing device can determine whether the code matches at block 330, and the computing device can provide access to the attempted user at block 334 if the code matches, or the computing device can reject access to the attempted user at block 332 if the code does not match.

In response to the computing device determining a portion of the real-time image is obstructed at block 324, the computing device can compare the unobstructed portion of the real-time image to a portion of the reference image corresponding to the unobstructed portion of the real-time image at block 336. If the attempted user is wearing a hat that covers the attempted user's hair, hairline, eyebrows, and/or ears in the real-time image, the computing device can compare the attempted user's eyes, nose, lips, and/or chin to the authorized user's eyes, nose, lips, and/or chin. For example, the computing device can compare the attempted user's nose to the authorized user's nose by determining the distance between nostrils of the attempted user and the authorized user using the number of pixels and the size of the pixels in the real-time image and the reference image.

If the computing device determines the unobstructed portion of the real-time image matches the portion of the reference image corresponding to the unobstructed portion of the real-time image at block 338, the computing device can provide access to the attempted user at block 334. If the computing device determines the unobstructed portion of the real-time image does not match the portion of the reference image corresponding to the unobstructed portion of the real-time image at block 338, the attempted user can enter a code at block 328. If the code matches at block 330, the computing device can provide access to the attempted user at block 334. If the code does not match at block 330, the computing device can reject access to the attempted user at block 332.

Figure 4:
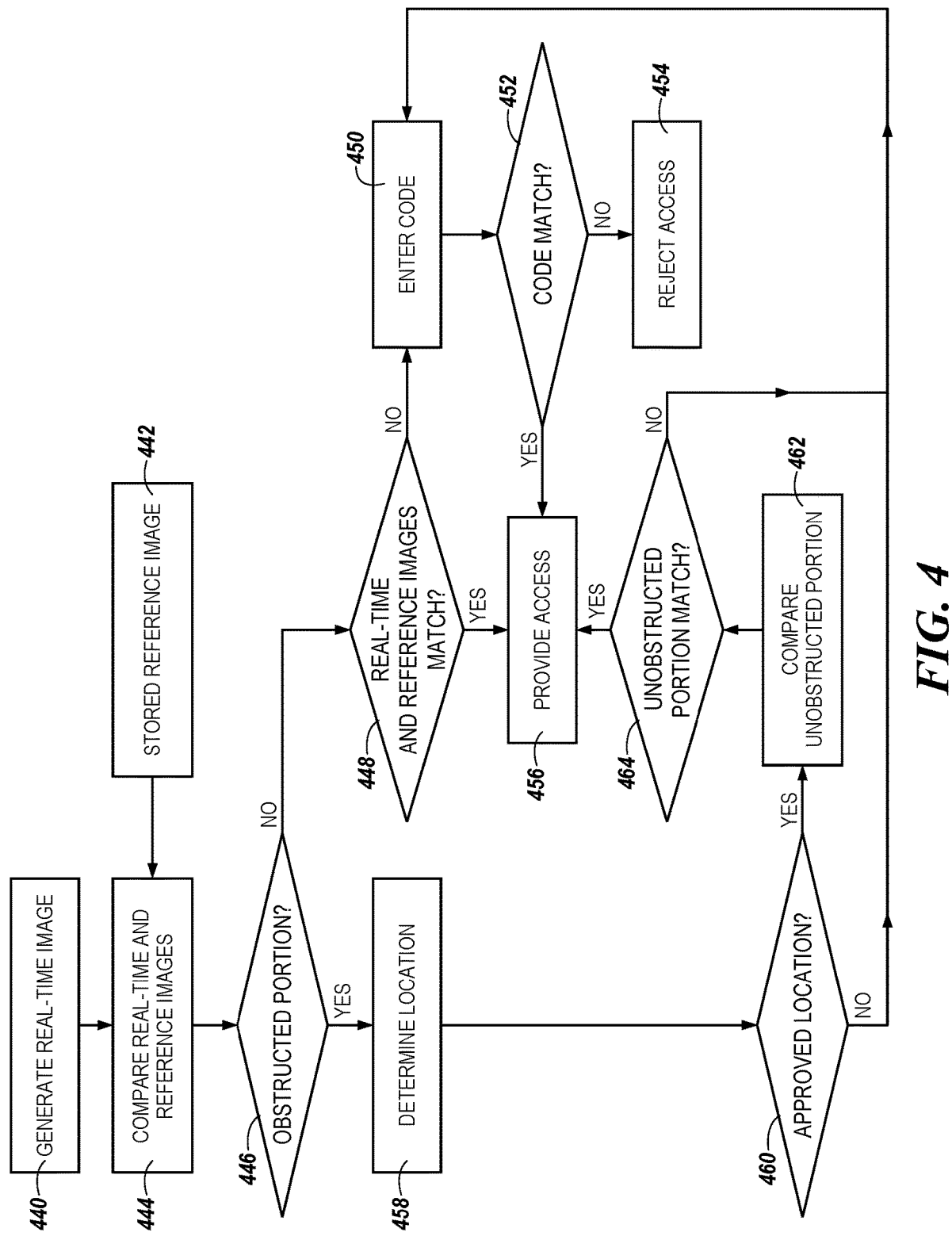
FIG. 4 illustrates an example of a flow diagram for providing access to a computing device in accordance with a number of embodiments of the present disclosure.

FIG. 4 illustrates an example of a flow diagram for providing access to a computing device (e.g., computing device 100 in FIG. 1 and/or computing device 200 in FIG. 2) in accordance with a number of embodiments of the present disclosure. An image sensor (e.g. image sensor 102 in FIG. 1 and/or image sensor 202 in FIG. 2) of the computing device can generate a real-time image of an attempted user at block 440.

A memory (e.g., memory 210 in FIG. 2) of the computing device can store a reference image of an authorized user at block 442. The reference image can be taken of the authorized user during setup of the computing device and/or when setting security settings. In some examples, the authorized user can capture the reference image including their face without any obstructions. The reference image can be used by the computing device for full and/or partial facial recognition.

The real-time image and the reference image can be compared at block 444 during a facial recognition operation. In a number of embodiments, a facial recognition operation can include comparing pixel values of the real-time image to pixel values of the reference image. The computing device can determine a portion of the attempted user in the real-time image is obstructed at block 446 in response to a particular number of pixels in the real-time image being different from a corresponding number of pixels in the reference image.

If the computing device determines there is no obstructed portion in the real-time image at block 446, the computing device can determine whether the real-time and reference images match at block 448. The real-time and reference images can match if a threshold number of pixel values of the real-time image are equal to pixel values of corresponding pixels in the reference image. The computing device can provide access to the attempted user at block 456 if the real-time and reference images match.

If the real-time and reference images do not match, the attempted user can enter a code at block 450. The computing device can determine whether the code matches at block 452 and the computing device can provide access to the attempted user at block 456, if the code matches or the computing device can reject access to the attempted user at block 454, if the code does not match.

In response to the computing device determining a portion of the real-time image is obstructed at block 446, the computing device can determine a location of the computing device at block 458. In a number of embodiments, the location of the computing device can be determined using GPS (e.g., GPS 216 in FIG. 2), a Wi-Fi network, a Bluetooth connection, and/or image recognition. In some examples, the computing device can determine the computing device is at the authorized user's workplace using image recognition. For example, the real-time image may include a cubicle in the background that has been in the background of previous real-time images including previous attempted users that have matched with the authorized user.

The authorized user can set and/or create security settings that allow access to the computing device even with an obstructed portion of the real-time image. In a number of embodiments, the authorized user may allow access to the computing device with an obstructed portion of the real-time image if the computing device is in an approved location as determined at block 460. An approved location can include the authorized user's cubicle, for example.

If the computing device determines the computing device is in an approved location at block 460, the computing device can compare the unobstructed portion of the real-time image to a portion of the reference image corresponding to the unobstructed portion of the real-time image at block 462.

If the computing device determines the unobstructed portion of the real-time image matches the portion of the reference image corresponding to the unobstructed portion of the real-time image at block 464, the computing device can provide access to the attempted user at block 456. If the computing device determines the computing device is not at an approved location at block 460 or the unobstructed portion of the real-time image does not match the portion of the reference image corresponding to the unobstructed portion of the real-time image at block 464, the attempted user can enter a code at block 450. If the code matches at block 452, the computing device can provide access to the attempted user at block 456. If the code does not match at block 452, the computing device can reject access to the attempted user at block 454.

Figure 5:
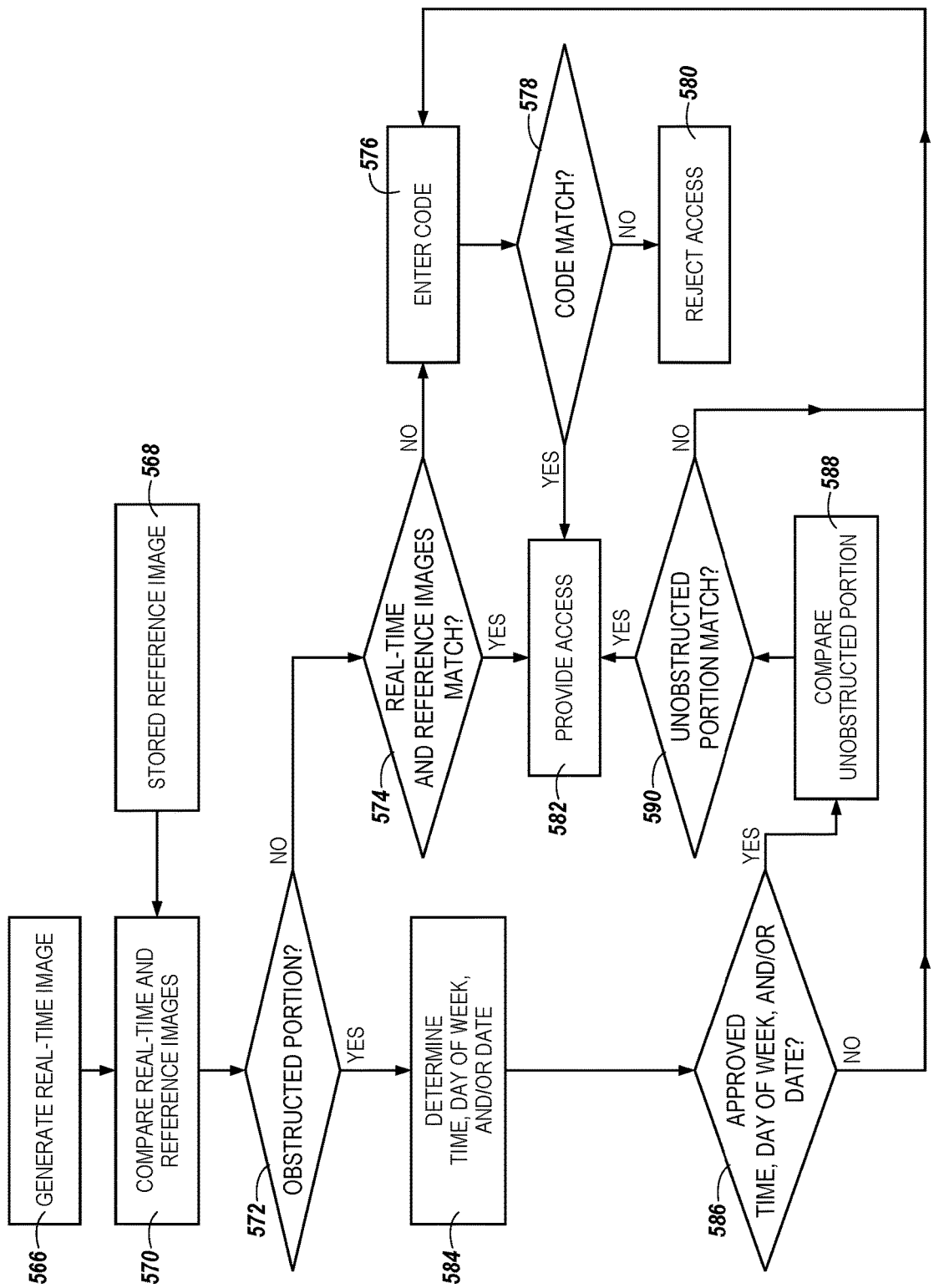
FIG. 5 illustrates an example of a flow diagram for providing access to a computing device in accordance with a number of embodiments of the present disclosure.

FIG. 5 illustrates an example of a flow diagram for providing access to a computing device (e.g., computing device 100 in FIG. 1 and/or computing device 200 in FIG. 2) in accordance with a number of embodiments of the present disclosure. An image sensor (e.g. image sensor 102 in FIG. 1 and/or image sensor 202 in FIG. 2) of the computing device can generate a real-time image of an attempted user at block 566.

A memory (e.g., memory 210 in FIG. 2) of the computing device can store a reference image of an authorized user at block 568. The reference image can be taken of the authorized user during setup of the computing device and/or when setting security settings. In some examples, the authorized user can capture the reference image including their face without any obstructions. The reference image can be used by the computing device for full and/or partial facial recognition.

The real-time image and the reference image can be compared at block 570 during a facial recognition operation. In a number of embodiments, a facial recognition operation can include comparing pixel values of the real-time image to pixel values of the reference image. The computing device can determine a portion of the attempted user in the real-time image is obstructed at block 572 in response to a particular number of pixels in the real-time image being different from a corresponding number of pixels in the reference image.

If the computing device determines there is no obstructed portion in the real-time image at block 572, the computing device can determine whether the real-time and reference images match at block 574. The real-time and reference images can match if a threshold number of pixel values in the real-time image are equal to pixel values of corresponding pixels in the reference image. The computing device can provide access to the attempted user at block 582 if the real-time and reference images match.

If the real-time and reference images do not match, the attempted user can enter a code at block 576. The computing device can determine whether the code matches at block 578, and the computing device can provide access to the attempted user at block 582 if the code matches, or the computing device can reject access to the attempted user at block 580 if the code does not match.

In response to the computing device determining a portion of the real-time image is obstructed at block 572, the computing device can determine the time, day of the week, and/or date at block 584. In a number of embodiments, the time, day of the week, and/or date can be determined from the operating system of the computing device or an application on the computing device.

The authorized user can set and/or create security settings that allow access to the computing device even with an obstructed portion of the real-time image. In a number of embodiments, the authorized user may allow access to the computing device with an obstructed portion of the real-time image if the time, day of the week, and/or date is an approved time, day of the week, and/or date as determined at block 586. An approved time could be the authorized user's work hours from 8:00 a.m. to 5:00 p.m., for example.

If the computing device determines the time, day of the week, and/or the date is an approved time, day of the week, and/or date at block 586, the computing device can compare the unobstructed portion of the real-time image to a portion of the reference image corresponding to the unobstructed portion of the real-time image at block 588.

If the computing device determines the unobstructed portion of the real-time image matches the portion of the reference image corresponding to the unobstructed portion of the real-time image at block 590, the computing device can provide access to the attempted user at block 582. If the computing device determines the computing device is not at an approved time, day of the week, and/or date at block 586 or the unobstructed portion of the real-time image does not match the portion of the reference image corresponding to the unobstructed portion of the real-time image at block 590, the attempted user can enter a code at block 576. If the code matches at block 578, the computing device can provide access to the attempted user at block 582. If the code does not match at block 578, the computing device can reject access to the attempted user at block 580.

Figure 6:
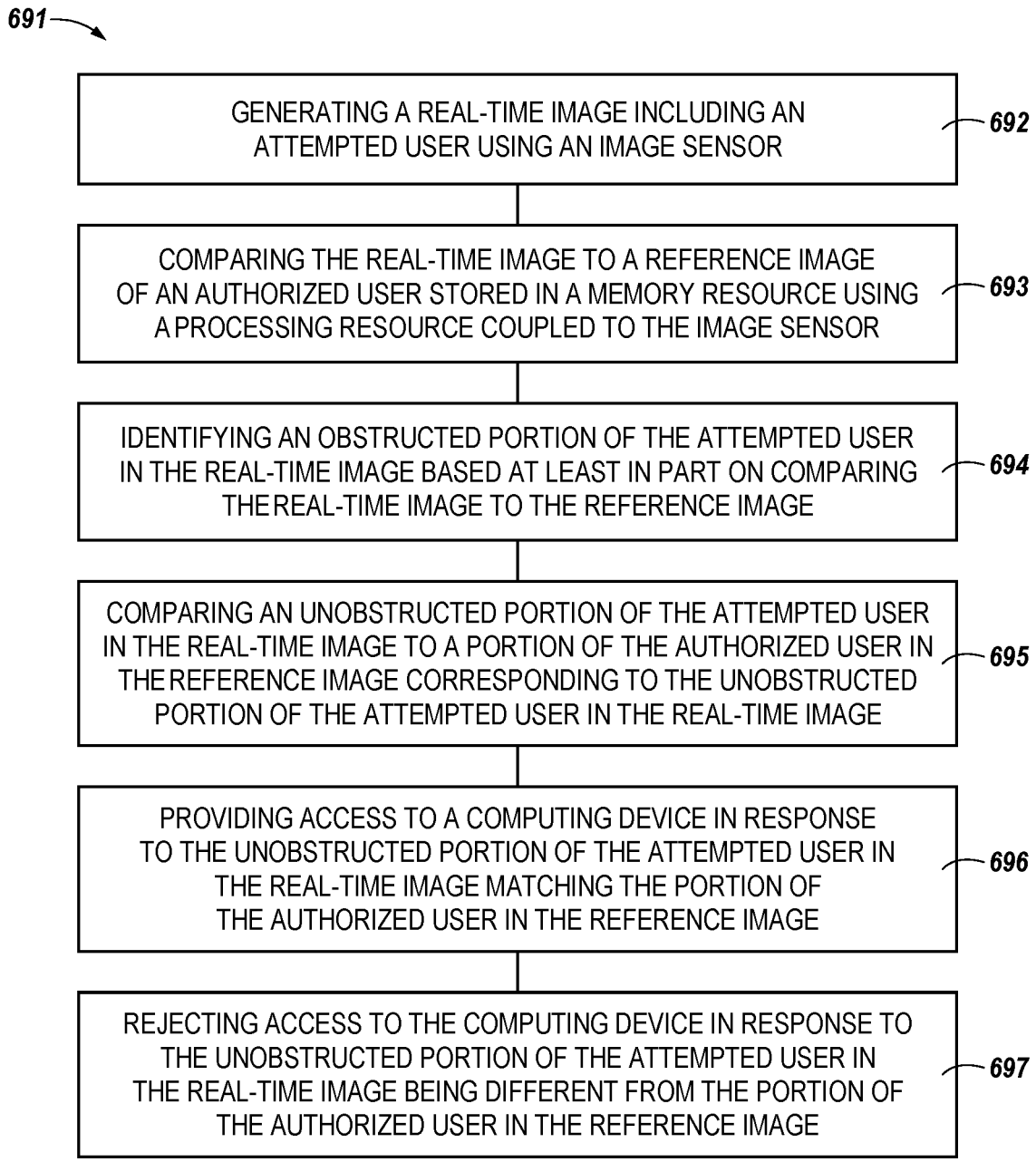
FIG. 6 is a flow diagram of a method for providing access to a computing device in accordance with a number of embodiments of the present disclosure.

FIG. 6 is a flow diagram of a method 691 for providing access to a computing device in accordance with a number of embodiments of the present disclosure. At block 692, the method 691 can include generating a real-time image including an attempted user using an image sensor. The image sensor can be a camera included in the computing device, for example.

At block 693, the method 691 can include comparing the real-time image to a reference image of an authorized user stored in a memory resource using a processing resource coupled to the image sensor. The reference image can be taken of the authorized user during setup of the computing device and/or when setting security settings. The comparison can include comparing pixel values of the real-time image to pixel values of the reference image.

At block 694, the method 691 can include identifying an obstructed portion of the attempted user in the real-time image based at least in part on comparing the real-time image to the reference image. The computing device can determine a portion of the attempted user in the real-time image is obstructed in response to a particular number of pixels in the real-time image being different from a corresponding number of pixels in the reference image.

The method 691 can further include receiving a request for another authentication method from the computing device in response to identifying the obstructed portion of the attempted user in the real-time image. In a number of embodiments, receiving real-time audio from the attempted user via a microphone and comparing the real-time audio to reference audio from the authorized user stored in the memory resource can be included in method 691 as another authentication method. Method 691 can further include providing access to the computing device in response to the real-time audio from the attempted user matching the reference audio from the authorized user, wherein the access to the computing device is limited access or unlimited access.

At block 695, the method 691 can include comparing an unobstructed portion of the attempted user in the real-time image to a portion of the authorized user in the reference image corresponding to the unobstructed portion of the attempted user in the real-time image. For example, if the attempted user's face is obstructed by eyewear, the unobstructed portion could include a user's lips. Accordingly, the lips of the attempted user could be compared to the lips of the authorized user.

At block 696, the method 691 can include providing access to a computing device in response to the unobstructed portion of the attempted user in the real-time image matching the portion of the authorized user in the reference image. The method 691 can further include providing limited access to the computing device by restricting access to a number of applications on the computing device, restricting purchases using the computing device, restricting access to confidential information on the computing device, and/or restricting access to settings of the computing device.

At block 697, the method 691 can include rejecting access to the computing device in response to the unobstructed portion of the attempted user in the real-time image being different from the portion of the authorized user in the reference image. Rejecting access to the computing device could prevent the attempted user from performing operations on the computing device. For example, the attempted user may be unable to open the computing device, make phone calls, send text messages, and/or connect to the internet.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   generating a real-time image including a face of an attempted user using an image sensor;
   comparing the real-time image to a reference image of a face of an authorized user stored in a memory resource using a processing resource coupled to the image sensor;
   identifying an obstructed portion of the face of the attempted user in the real-time image based at least in part on comparing the real-time image to the reference image of the authorized user;
   determining at least one of: a time, day of the week, or date;
   comparing an unobstructed portion of the face of the attempted user in the real-time image to a portion of the face of the authorized user in the reference image corresponding to the unobstructed portion of the face of the attempted user in the real-time image in response to the time, the day of the week, or the date being an approved time, day of the week, or date;
   providing limited access to a computing device in response to the unobstructed portion of the face of the attempted user in the real-time image matching the portion of the face of the authorized user in the reference image; and
   rejecting access to the computing device in response to the unobstructed portion of the face of the attempted user in the real-time image being different from the portion of the face of the authorized user in the reference image.

2. The method of claim 1, further comprising providing limited access to the computing device by restricting access to a number of applications on the computing device.

3. The method of claim 1, further comprising providing limited access to the computing device by restricting purchases using the computing device.

4. The method of claim 1, further comprising providing limited access to the computing device by restricting access to confidential information on the computing device.

5. The method of claim 1, further comprising providing limited access to the computing device by restricting access to settings of the computing device.

6. The method of claim 1, further comprising receiving a request for another authentication method from the computing device in response to identifying the obstructed portion of the attempted user in the real-time image.

7. The method of claim 1, further comprising:
   receiving real-time audio from the attempted user via a microphone; and
   comparing the real-time audio to reference audio from the authorized user stored in the memory resource.

8. The method of claim 7, further comprising providing unlimited access to the computing device in response to the real-time audio from the attempted user matching the reference audio from the authorized user.

9. An apparatus, comprising:
   an image sensor configured to generate a real-time image including a face of an attempted user;
   a memory resource configured to store a reference image of a face of an authorized user; and
   a processing resource configured to:
      compare the real-time image to the reference image;
      identify an obstructed portion of the face of the attempted user in the real-time image based at least in part on comparing the real-time image to the reference image of the authorized user;
      determine a location of the apparatus image recognition;
      determine at least one of: a time, day of the week, or date;
      compare an unobstructed portion of the face of the attempted user in the real-time image to a portion of the face of the authorized user in the reference image corresponding to the unobstructed portion of the face of the attempted user in the real-time image based at least in part on the location of the apparatus and the time, the day of the week, or the date being an approved time, day of the week, or date;
      provide access to the apparatus in response to the unobstructed portion of the face of the attempted user in the real-time image matching the portion of the face of the authorized user in the reference image; and
      reject access to the apparatus in response to the unobstructed portion of the face of the attempted user in the real-time image being different from the portion of the face of the authorized user in the reference image.

10. The apparatus of claim 9, wherein the access to the apparatus is limited based at least in part on the location of the apparatus.

11. The apparatus of claim 9, further comprising a user interface, wherein the user interface is configured to display a prompt to set a security setting based at least in part on the location of the apparatus.

12. The apparatus of claim 9, wherein:
   the image sensor is configured to generate another real-time image including the attempted user after a particular period of time has passed since providing access to the attempted user; and
   the processing resource configured to:
      compare the other real-time image to the reference image;
      continue providing access to the apparatus in response to an unobstructed portion of the attempted user in the other real-time image matching the portion of the authorized user in the reference image; and
      reject access to the apparatus in response to the unobstructed portion of the attempted user in the other real-time image being different from the portion of the authorized user in the reference image.

13. An apparatus, comprising:
   an image sensor configured to generate a real-time image including a face of an attempted user;
   a memory resource configured to store a reference image of a face of an authorized user; and
   a processing resource configured to:
      compare the real-time image to the reference image;

identify an obstructed portion of the face of the attempted user in the real-time image based at least in part on comparing the real-time image to the reference image of the authorized user;

determine at least one of: a time, day of the week, or date from an operating system of the apparatus or an application on the apparatus;

compare an unobstructed portion of the face of the attempted user in the real-time image to a portion of the face of the authorized user in the reference image corresponding to the unobstructed portion of the face of the attempted user in the real-time image based at least in part on at least one of: the time, the day of the week, or the date being an approved time, day of the week, or date;

provide access to the apparatus in response to the unobstructed portion of the face of the attempted user in the real-time image matching the portion of the face of the authorized user in the reference image; and reject access to the apparatus in response to the unobstructed portion of the face of the attempted user in the real-time image being different from the portion of the face of the authorized user in the reference image.

14. The apparatus of claim 13, wherein the access to the apparatus is limited access to the apparatus based at least in part on at least one of: the time, the day of the week, or the date.

15. The apparatus of claim 13, wherein the unobstructed portion of the attempted user includes at least one of: a nose, mouth, chin, hairline, eye, or eyebrow.

16. The apparatus of claim 13, further comprising an artificial intelligence (AI) model stored in the memory resource, wherein the AI model is configured to receive at least one of: a present image, a present timestamp, a present location, or present audio each time the processing resource provides access to the apparatus.

17. The apparatus of claim 16, wherein the AI model is configured to output a security setting in response to performing an AI operation on at least one of: the present image, the present timestamp, the present location, or the present audio.

\* \* \* \* \*